July 7, 1959   C. E. S. RIDGERS ET AL   2,894,220
RADAR APPARATUS
Filed March 26, 1956

United States Patent Office 2,894,220
Patented July 7, 1959

2,894,220
RADAR APPARATUS

Charles Edward Sydney Ridgers and Ronald Herbert Briggs, London, England, assignors to The Decca Record Company Limited, London, England, a British company Application March 26, 1956, Serial No. 573,870
Claims priority, application Great Britain March 30, 1955
12 Claims. (Cl. 333—24)

This invention relates to rotatable couplers for feeding, to a static part of a radar apparatus, intermediate frequency signals from a radar receiver which is mounted on a rotating antenna system. Such couplers, which will hereinafter be described as rotatable couplers of the kind referred to, have to be employed in radar apparatus where the radio frequency receiver and frequency changer are rotatable with the antenna system.

Particularly in microwave pulse radar apparatus operating at the very high frequencies which can now be employed, very short pulse lengths are used and it is therefore necessary to employ a very wide intermediate frequency band width in order to preserve, in the display, the advantages obtained by the short pulse length. It is an object of the present invention to provide a rotatable coupler having a very small loss which is substanially uniform over a wide band width.

According to this invention, in a rotatable coupler of the kind referred to, both inductive and capacitive coupling elements are provided. Compared with existing types of rotatable couplers employing only inductive coupling, the increased coupling due to the capacitance increases both the band width and the gain and it has been found possible to make a rotatable coupler having a band width measured between the frequencies where the response falls by ½ db, of over 30 m.c./s. over a band having a mid-frequency of about 60 m.c./s.

In one arrangement of rotatable coupler, there are provided primary and secondary windings inductively coupled and arranged to be relatively rotatable without any variation of mutual inductance, one end of one winding being coupled to one end of the other winding by a connection of substantially zero impedance, and the other ends of the two windings being connected respectively to relatively rotatable plates of a rotatable capacitive connection, the plates being arranged to be relatively rotatable without any variation of the capacitance between them. The connection of substantially zero impedance between said one end of one winding and said one end of the other winding may be effected through a slip ring connection. It has been found preferable to provide some capacitance between the ends of the coils which are connected through the slip rings in order to reduce any high frequency noise which might be produced by imperfect brush contact, this capacitance being in addition to a capacitance provided across the slip rings.

The primary and secondary windings may be arranged as cylindrical coils of different diameter, one inside the other, the windings being relatively rotatable about the axis to one of the windings. Most conveniently the two windings are coaxial and are relatively rotatable about their common axis.

The two plates of the rotatable capacitive connection may comprise two conductive cylinders of different diameter, one inside the other, the two cylinders being relatively rotatable about the axis of one of them. Most conveniently the cylinders are coaxial and relatively rotatable about their common axis. To prevent cylinders adjacent a winding from acting as short circuited turns coupled to the winding, the cylinders may each have an axial slit. Instead of using cylinders, particularly if only a small coupling capacitance is required, the two plates of the rotatable capacitive connection may comprise two circular discs relatively rotatable about the axis of one of them.

It has been found preferable that the windings should not be resonant within the pass band of the coupler. It will be generally convenient in a coupler for feeding intermediate frequency signals from a radar receiver to employ coaxial cable input and output connections and in this case the output winding may be matched to the coaxial output connection and the input winding may be at least partly tuned by the capacitance of the input coaxial cable.

The following is a description of one embodiment of the invention, reference being made to the accompanying drawings in which.

Figure 1:
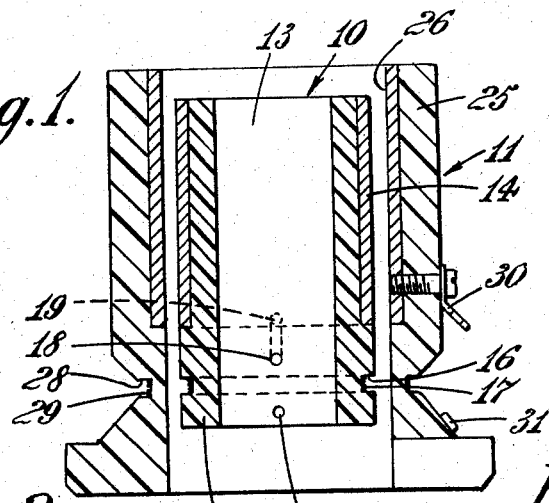
Figure 1 is a sectional elevation of a rotatable coupler.
Figure 2:
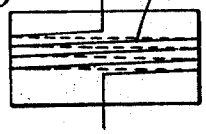
Figures 2 and 3 are diagrams showing the sense of the rotor and stator windings employed in the coupler of Figure 1.
Figure 4:
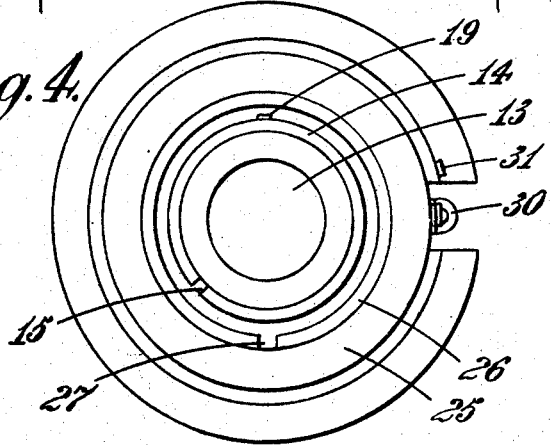
Figure 4 is a plan view of the coupler of Figure 1.

Referring to Figures 1 and 4, there is shown a rotatable coupler for feeding, to a static part of a radar apparatus, intermediate frequency signals from a radar receiver which is mounted on a rotating antenna system. The coupler consists of a rotor 10 mounted within a stator 11. The rotor comprises an inner former 12 of non-conductive material, this former being of generally cylindrical form and having an internal bore 13. The top part of the former 12 is surrounded by a cylindrical conductive plate 14 which forms, as will be apparent later, one of the two plates of the capacitive connection, this plate 14 having an axial slit 15 extending for the whole of its length. Below the plate 14, the former 12 is formed with an external groove 16 in which is wound a rotor winding 17. In a typical construction, the bottom of the groove may be slightly less than ¾" diameter and have four turns of 30 S.W.G. copper wire forming a cylindrical winding. The sense of the winding is shown in Figure 2 which is a view in elevation of the winding drawn on a scale greatly enlarged in the axial direction.

Connection from the radar reciver to the rotor is effected by means of a coaxial cable which is led into the bottom part of the bore 13. The inner conductor of this cable is led through a hole 18 to the outer surface of the former 12, and there it is connected to the top end of the rotor winding 17 and also by means of a short connecting link 19 to the cylindrical plate 14. The outer conductor of the coaxial cable is connected, through a hole 20 in the former, to the bottom end of the winding 17.

Figure 3:
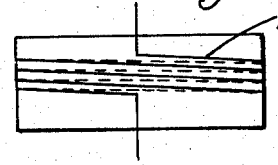

The stator 11 comprises an outer former 25 of non-conducting material carrying an inner cylindrical conductive plate 26 to form the second plate of the capacitive connection. This cylindrical plate 26 has an axial slit 27 extending the whole of its length as shown in Figure 4. The former 25 also has an external groove 28 in which is wound a stator winding 29. An elevation view of this stator winding with an enlarged scale in an axial direction is shown in Figure 3 from which it will be seen that this winding is wound in the opposite sense to the rotor winding 17. In a typical construction having a size of rotor winding mentioned above, the stator winding might comprise four turns of 30 S.W.G. copper wire wound in the groove of slightly less than one inch diameter. The connections to the stator winding are effected from a coaxial cable, the inner conductor of the cable being connected to a tag 30 which is connected to the plate 26 and is also connected to the top end of the stator winding 29. The outer conductor of the coaxial cable is connected to a tag 31 which in turn is connected to the lower end of the stator winding 29.

As seen in Figure 1, the stator winding 29 surrounds the rotor winding 17 and the two windings are coaxial. Likewise the plate 26 of the stator surrounds and is coaxial with the plate 14 of the rotor. It is important to avoid any variation in either the mutual inductance of the two windings or the capacitance of the two plates during relative rotation. Although in the construction described, the two windings and the two plates are coaxial, this is not essential provided the axis of rotation coincides with the axis of one of the windings and of one of the plates.

Figure 5:
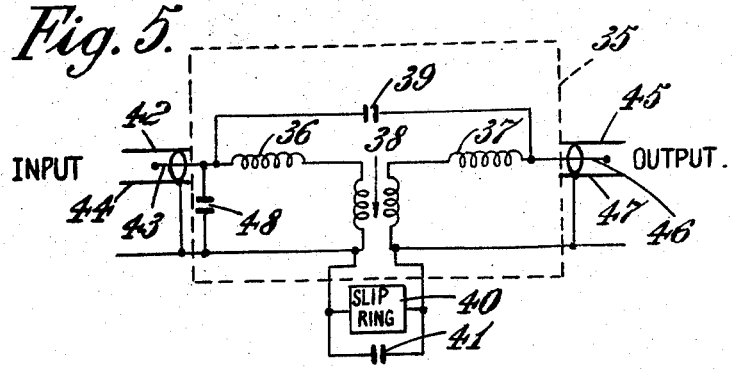
Figure 5 is a diagram showing the equivalent circuit of the coupler of Figure 1 together with associated input and output connections.

Figure 5 illustrates within the dash line 35 the equivalent circuit of the coupler. The two windings 17 and 29 are represented by self inductances 36, 37 respectively together with a mutual inductance 38. The capacitance between the plates 14 and 26 is represented by the capacitor 39. The bottom ends of the two windings are connected together by a slip ring connection indicated diagrammatically at 40. In order to prevent any high frequency noise which might be produced by imperfect brush contact a capacitor 41 is connected across this slip ring connection. An input coaxial cable 42 has its inner conductor 43 connected to that end of the winding 17 remote from the slip ring and has its outer conductor 44 connected to the slip ring end of the winding 17. Similarly, an output coaxial cable 45 has its inner conductor 46 connected to that end of the winding 29 remote from the slip ring and its outer conductor 47 connected to the other end of this winding.

As previously stated, it has been found preferable that the windings should not be resonant within the pass band of the coupler. The output winding 24 may be matched to the output coaxial cable and the input winding 17 may be tuned so as to be outside the pass band of the coupler partly or wholly by the capacitance of the input coaxial cable, this capacitance being indicated by the capacity 48 in Figure 5. In a typical construction using windings of the dimensions indicated above, and having a band width of 20 megacycles per second centered at a frequency of 60 megacycles per second, this tuning capacitance 48 might be of the order of 35 micro-microfarads and this may readily be obtained from a suitable length of coaxial cable.

We claim:

1. A rotatable coupler comprising primary and secondary inductively coupled cylindrical windings of different diameters co-axially supported one inside the other for relative rotation about their common axes, a connection of substantially zero impedance connecting one end of one winding to one end of the other winding, two conductive cylinders of different diameters supported co-axially one inside the other for relative rotation about their common axes, which axes are in line with said common axes of said windings, support means securing one of said windings on one of said cylinders, support means securing the other of said windings to the other of said cylinders, a connection of substantially zero impedance connecting one end of one winding to one end of the other winding, connections of substantially zero impedance connecting the other ends of said windings to the cylinders respectively associated with the two windings, and input and output circuits connected across said primary and secondary windings respectively.

2. A rotatable coupler comprising primary and secondary windings inductively coupled and arranged to be relatively rotatable with constant mutual inductance, one end of one winding being coupled to one end of the other winding by a connection of substantially zero impedance and the other ends of the two windings being connected respectively to relatively rotatable plates of a rotatable capacitive connection, the plates being arranged to be relatively rotatable with constant capacitance between them, and input and output circuits connected across said primary and secondary windings respectively.

3. A rotatable coupler as claimed in claim 2 wherein said one end of one winding is connected to said one end of the other winding through a slip ring connection.

4. A rotatable coupler as claimed in claim 3 wherein a capacitor is connected in shunt across said slip ring connection.

5. A rotatable coupler as claimed in claim 2 wherein the primary and secondary windings are co-axial and are relatively rotatable about their common axis.

6. A rotatable coupler comprising primary and secondary windings inductively coupled and arranged to be relatively rotatable with constant mutual inductance, one end of one winding being coupled to one end of the other winding by a connection of substantially zero impedance, a rotatable capacitive connection consisting of two conductive cylinders connected respectively to the other ends of said windings, the cylinders being of different diameter, one inside the other and being relatively rotatable about the axis of one of them with constant capacitance between them, and input and output circuits connected across said primary and secondary windings respectively.

7. A rotatable coupler comprising primary and secondary windings inductively coupled and arranged to be relatively rotatable with constant mutual inductance, the windings being tuned to resonant frequencies outside the pass-band of the coupler and one end of one winding being coupled to one end of the other winding by a connection of substantially zero impedance, a rotatable capacitive connection consisting of two relatively rotatable plates connected respectively to the other ends of the two windings, the plates being arranged to be relatively rotatable with constant capacitance between them, and input and output circuits connected across said primary and secondary windings respectively.

8. A rotatable coupler as claimed in claim 6 wherein the two cylinders are coaxial and relatively rotatable about their common axis.

9. A rotatable coupler as claimed in claim 1 wherein each cylinder has an axial slit to prevent it acting as a short-circuited turn coupled to the windings.

10. A rotatable coupler as claimed in claim 2 wherein the two plates of the rotatable capacitive connection comprise two circular discs relatively rotatable about the axis of one of them.

11. A rotatable coupler as claimed in claim 7 and having coaxial cable input and output connections, the output winding being matched to the coaxial output connection and the input winding being at least partly tuned by the capacitance of the input coaxial cable.

12. A rotatable coupler comprising primary and secondary windings are arranged as inductively coupled cylindrical coils of different diameter, one inside the other, the windings being relatively rotatable about the axis of one of the windings with constant mutual inductance and one end of one winding being coupled to one end of the other winding by a connection of substantially zero impedance, a rotatable capacitive connection consisting of two relatively rotatable plates connected respectively to the other ends of the two windings, the plates being arranged to be relatively rotatable with constant capacitance between them, and input and output circuits connected across said primary and secondary windings respectively.

References Cited in the file of this patent

UNITED STATES PATENTS

| | | |
|---|---|---|
| 2,064,585 | Atienza | Dec. 15, 1936 |
| 2,405,616 | Silver | Aug. 13, 1946 |
| 2,602,118 | Adams et al. | July 1, 1952 |
| 2,760,061 | Pan et al. | Aug. 21, 1956 |